(12) United States Patent
Tsuchihashi et al.

(10) Patent No.: US 7,504,988 B2
(45) Date of Patent: Mar. 17, 2009

(54) RADAR DEVICE WITH OVERLAPPING SHORT AND LONG RANGE SENSORS

(75) Inventors: Masataka Tsuchihashi, Kobe (JP); Nobukazu Shima, Kobe (JP); Kazuo Shirakawa, Kawasaki (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 83 days.

(21) Appl. No.: 11/878,073

(22) Filed: Jul. 20, 2007

(65) Prior Publication Data
US 2008/0136702 A1  Jun. 12, 2008

(30) Foreign Application Priority Data
Aug. 10, 2006 (JP) ............... 2006-217861

(51) Int. Cl.
*G01S 13/93* (2006.01)
(52) U.S. Cl. ............... 342/70; 342/61; 342/59; 342/158
(58) Field of Classification Search ............ 342/70–72, 342/61–69, 52–54, 59, 94, 110, 155, 158
See application file for complete search history.

(56) References Cited

U.S. PATENT DOCUMENTS

| | | | | |
|---|---|---|---|---|
| 5,485,155 A * | 1/1996 | Hibino | ............ | 342/70 |
| 6,047,244 A * | 4/2000 | Rud, Jr. | ............ | 702/98 |
| 6,509,863 B2 * | 1/2003 | Zoratti et al. | ............ | 342/70 |
| 6,580,385 B1 * | 6/2003 | Winner et al. | ............ | 342/70 |
| 6,816,084 B2 * | 11/2004 | Stein | ............ | 340/903 |
| 7,012,560 B2 * | 3/2006 | Braeuchle et al. | ............ | 342/70 |
| 7,026,978 B2 * | 4/2006 | Okamura et al. | ............ | 342/81 |
| 7,132,976 B2 * | 11/2006 | Shinoda et al. | ............ | 342/70 |
| 7,142,150 B2 * | 11/2006 | Thackray | ............ | 342/54 |
| 7,275,431 B2 * | 10/2007 | Zimmermann et al. | ............ | 73/510 |
| 7,277,042 B1 * | 10/2007 | Cho et al. | ............ | 342/25 F |
| 7,278,505 B2 * | 10/2007 | Fujioka et al. | ............ | 180/170 |
| 7,376,247 B2 * | 5/2008 | Ohta et al. | ............ | 382/103 |
| 2007/0205938 A1 * | 9/2007 | Zimmermann et al. | ............ | 342/69 |
| 2008/0117098 A1 * | 5/2008 | Johnson et al. | ............ | 342/25 F |

FOREIGN PATENT DOCUMENTS

| | | |
|---|---|---|
| JP | A-07-017342 | 1/1995 |
| JP | A-2005-165752 | 6/2005 |

* cited by examiner

*Primary Examiner*—Thomas H Tarcza
*Assistant Examiner*—Cassi Galt
(74) *Attorney, Agent, or Firm*—Oliff & Berridge, PLC (57) ABSTRACT

A radar device has a long range radar sensor having a first transmission and receiving section for transmitting and receiving radio wave to a first detection range and a first signal processing section for detecting an object existing in the first detection range; a short range radar sensor having a second transmission and receiving section for transmitting and receiving a radio wave to a second detection range of which width is wider and of which distance is shorter than the first detection range and a second signal processing section for detecting an object existing in the second detection range; and a processing section for integrating information supplied from the first and second signal processing sections. And one of the long range radar sensor and the short range radar sensor stops a detection operation of the object to an overlapped range of both the detection ranges.

3 Claims, 9 Drawing Sheets

FIG.1

PRIOR ART

FIG.2

PRIOR ART

RADAR DEVICE WITH OVERLAPPING SHORT AND LONG RANGE SENSORS

CROSS-REFERENCE TO RELATED APPLICATIONS

This application is based upon and claims the benefit of priority from the prior Japanese Patent Application No. 2006-217861, filed on Aug. 10, 2006, the entire contents of which are incorporated herein by reference.

BACKGROUND OF THE INVENTION

1. Field of the Invention

The present invention relates to a radar device for detecting an object in front by radio waves, and more particularly to a radar device having two object detection sections.

2. Description of the Related Art

Radar devices installed on the front of a vehicle to measure distance to an object from the front of a vehicle and the relative velocity of the vehicle and the object have been proposed. By measuring the distance up to an object and the relative velocity, an alarm device for warning of an impending collision with an object in advance can be activated, or a brake can be activated to prevent collision with an object by using the measured distance and the relative velocity.

A phase mono-pulse type radar device is proposed as one of conventional radar devices. The phase-mono-pulse type radar device transmits a beam of an electromagnetic wave in a millimeter wave area, receives the wave reflected by an object using a plurality of receive antennas, and determines a direction of the object based on the phase difference of the receive waves.

Figure 1:
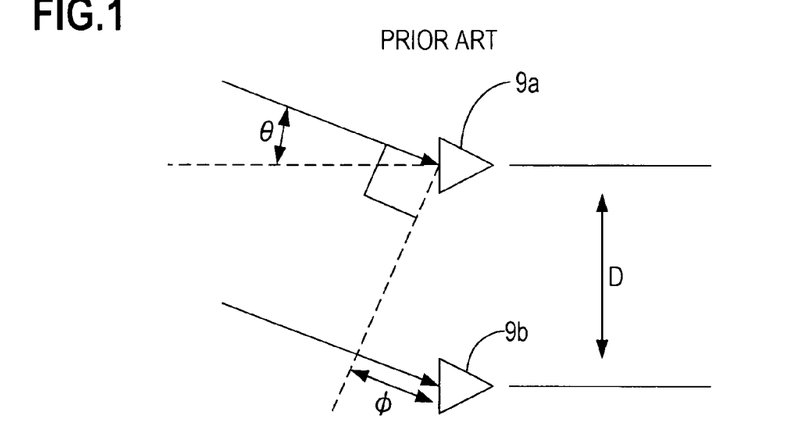
FIG. 1 is a diagram depicting an example of receiving a reflected wave in a phase mono-pulse type radar device.

FIG. 1 shows an example of receiving a reflected wave in the phase mono-pulse type radar device. Here θ is an angle to indicate the direction of an object when the front direction of the vehicle is 0°. The distance D is a space between two receive antennas, and the phase difference φ is a phase difference of the two receive waves. The two receive antennas 9a and 9b receive the waves reflected by the object existing at angle θ direction. The angle θ which indicates the direction of the object, which reflects the waves to be received by the two receiver antennas, is determined by the following expression.

$$\theta = \sin^{-1}(\lambda\phi/2\pi D) \quad \text{[Expression 1]}$$

Here λ is a wavelength of the receive wave.

Also recently, as shown in Japanese patent Application Laid-Open No. H7-17342, a radar device, just like above, which further has a long range sensor and short range sensor so that the sensors are selectively used depending on the detection area to detect objects in a wide range, has been proposed. This radar device has a long range sensor for transmitting a radio wave which extends over a long range in a narrow range to detect a vehicle ahead that should be followed up, and a short range sensor for transmitting a radio wave which extends over a short range in a wide angle to detect peripheral objects which may be collided with.

In contrary, transmitting a radio wave which reaches a long distance in a wide angle and searching a detection range equivalent to that of a radar device having two sensors requires high output and is technically difficult, and also a large volume of information on unnecessary objects is detected, which increases the signal processing volume.

Figure 2:
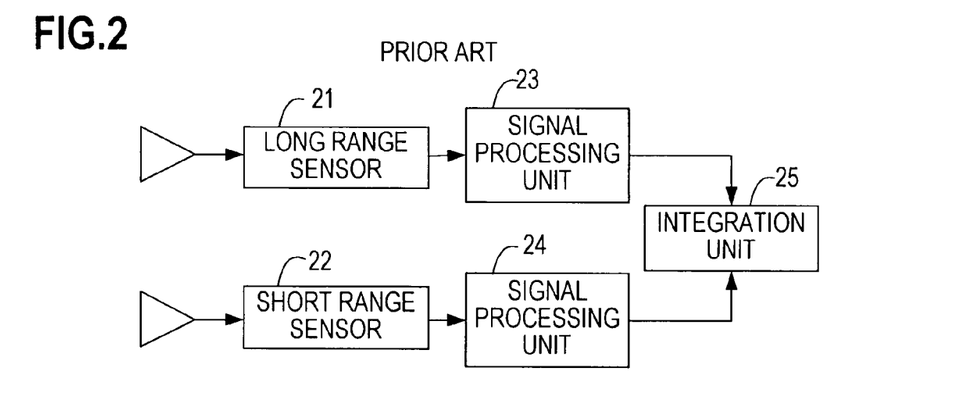
FIG. 2 is a conceptual diagram depicting a conventional radar device which has a long range sensor and a short range sensor.

FIG. 2 is a conceptual diagram depicting a conventional radar device having a long range sensor and a short range sensor. The long range sensor 21 and the short range sensor 22 transmit radio waves to and detect objects in the respective object detection ranges. The long range sensor 21 and the short range sensor 22 supply the received signals to signal processing units 23 and 24 respectively. Then, based on the supplied signals, the signal processing units 23 and 24 determine the distance, direction and velocity of the objects. Information on the objects determined by the signal processing units 23 and 24 are supplied to an integration unit 25, and the integration unit 25 integrates the provided information. In particularly, information on an object detected by both sensors is integrated into single information.

In this radar device, in some cases a same object is detected by the long distance sensor and the short distance sensor. In such a case, information, including a distance to the detected object, are not always matched between the two sensors, depending on the measurement errors and the size of the detected object. Therefore using the detection result of an object by the two sensors, the radar device calculates the distance d to the object by the following expression.

$$d = k \cdot df + (1-k) \cdot dn (k=0.9, 0.8, \ldots, 0.1) \quad \text{[Expression 2]}$$

Here df is a distance to the object detected by the long range sensor, and dn is a distance to the object detected by the short range sensor. The value k decreased by 0.1 each time the object is detected. By performing this linear interpolation, the long range sensor is switched to the short range sensor.

The same is also performed for detection of the velocity of an object. Using the detection results of an object, the radar device calculates the velocity v of the object by the following expression.

$$v = k \cdot vf + (1-k) \cdot vn (k=0.9, 0.8, \ldots, 0.1) \quad \text{[Expression 3]}$$

Here vf is a velocity of the object determined by the long range sensor, and vn is a velocity of the object determined by the short range sensor. The value k decreases by 0.1 each time the object is detected. By performing this linear interpolation, the long range sensor is switched to the short range sensor.

However, an overlap of the detection areas generated in this radar device having a long range sensor and short range sensor requires analysis of the receive signals by both sensors. Since an object is detected using two sensors for a same range, and acquired signals are separately analyzed, a double operation volume is required to analyze the receive signals in the overlapped range. Analyzing the received signals from the two sensors in the overlapped range requires time and involves a waste of processing capabilities of the processor, which diminishes efficiency.

Furthermore, if it is performed an operation to determine which of the detection results by the two sensors is regarded as important, the processing capabilities of the processor even more wastes, which worsens efficiency.

SUMMARY OF THE INVENTION

With the foregoing in view, it is an object of the present invention to provide a radar device having two sensors for a long range and short range, which can make received signal processing efficient in an area where two detection areas for long range and short range overlap.

To solve the above problem, a radar device according to the first aspect of the present invention has: a long range radar sensor that has a first transmission section for transmitting a radio wave to a first detection range of which center is a predetermined direction, a first receive section for receiving a reflected wave of the radio wave from the first detection range, and a first signal processing section for computing a receive signal supplied from the first receive section and detecting an object existing in the first detection range; a short range radar sensor that has a second transmission section for transmitting a radio wave to a second detection range of which center is the predetermined direction and of which width is wider and of which distance is shorter than the first detection range, a second receive section for receiving a reflected wave of the radio wave from the second detection range, and a second signal processing section for computing a receive signal supplied from the second receive section and detecting an object existing in the second detection range; and a processing section for integrating information on a detected object supplied from the first and second signal processing sections, wherein the second transmission section is set so as to stop transmission of the radio wave to an overlapped range included in both the first and second detection ranges.

A radar device according to the second aspect of the present invention has: a long range radar sensor that has a first transmission section for transmitting a radio wave to a first detection range of which center is a determined direction, a first receive section for receiving a reflected wave of the radio wave from the first detection range, and a first signal processing section for computing a receive signal supplied from the first receive section and detecting an object existing in the first detection range; a short range radar sensor that has a second transmission section for transmitting a radio wave to a second detection range of which center is the predetermined direction, of which width is wider and of which distance is shorter than the first detection range, and which partially overlaps with the first detection range, a second receive section for receiving a reflected wave of the radio wave from the second detection range, and a second signal processing section for computing a receive signal supplied from the second receive section and detecting an object existing in the second detection range; and a processing section for integrating information on a detected object supplied from the first and second signal processing sections, wherein one of the first and second signal processing sections stops the computing processing of the receive signal based on a reflected wave from an overlapped range included in both the first and second detection ranges.

A radar device according to the third aspect of the present invention has: a long range radar sensor that has a first transmission section for transmitting a radio wave to a first detection range of which center is a predetermined direction, a first receive section for receiving a reflected wave of the radio wave from the first detection range, and a first signal processing section for computing a receive signal supplied from the first receive section and detecting an object existing in the first detection range; a short range radar sensor that has a second transmission section for transmitting a radio wave to a second detection range of which center is a predetermined direction, of which width is wider and of which distance is shorter than the first detection range, and which partially overlaps with the first detection range, a second receive section for receiving a reflected wave of the radio wave from the second detection range, and a second signal processing section for computing a receive signal supplied from the second receive section and detecting an object existing in the second detection range; and a processing section for integrating information on a detected object supplied from the first and second signal processing sections, wherein the processing section detects an object using only information supplied from one of the first and second signal processing sections, out of the information on an object detected in the overlapped range included in both the first and second detection ranges.

The radar device of the present invention can make processing of the receive signals efficient by stopping the analysis of the receive signal in one of the sensor in the area where the two detection areas, for long range and for short range, overlap.

DESCRIPTION OF THE PREFERRED EMBODIMENTS

Embodiments of the present invention will now be described with reference to the drawings. The technical scope of the present invention, however, is not limited to these embodiments, but includes the content of the Claims and equivalents thereof.

Figure 3:
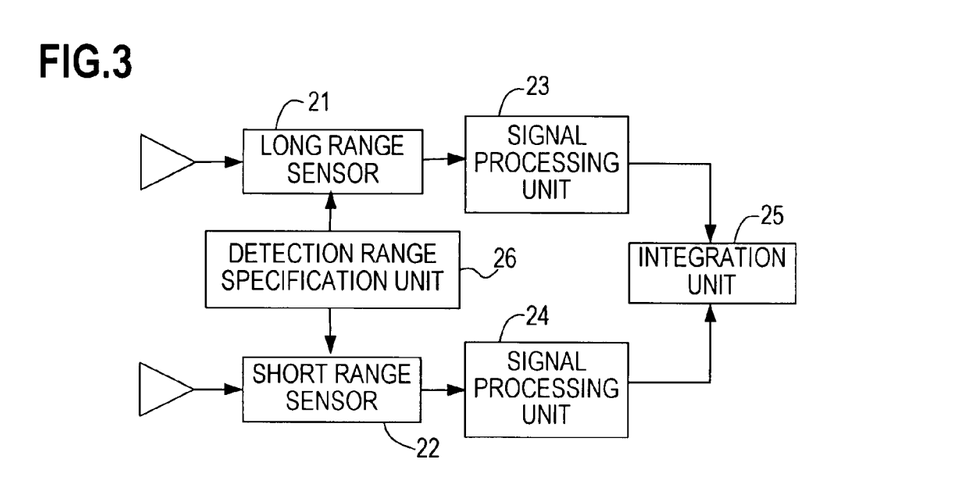
FIG. 3 is a conceptual diagram depicting an overlap prevention of the radar device according to a first embodiment of the present invention.

FIG. 3 is a conceptual diagram depicting overlap prevention of a radar device according to a first embodiment of the present invention. A detection range specification unit 26 specifies a detection range for a long range sensor 21 and a short range sensor 22 respectively. At this time, specification is performed so that the respective detection ranges do not overlap. The long range sensor 21 and the short range sensor 22 send radio waves to the respective object detection ranges and detect objects. The long range sensor 21 and the short range sensor 22 supply received signals to signal processing units 23 and 24 respectively. The signal processing units 23 and 24 determine the distance, direction and velocity of the objects based on the supplied signals. The information on the objects determined by the signal processing units 23 and 24 is supplied to an integration unit 25, and the integration unit 25 integrates the provided information. Since there is no overlap in detection ranges, there is no object that is detected by both of the sensors.

In this conceptual diagram, the detection range specification unit 26 specifies the detection ranges respectively for the long range radar 21 and the short range radar 22, but the detection range may be specified only for one of the sensors, while the other sensor performs conventional detection operation.

Now the configuration of the radar device for implementing the conceptual diagram in FIG. 3 will be described.

Figure 4:
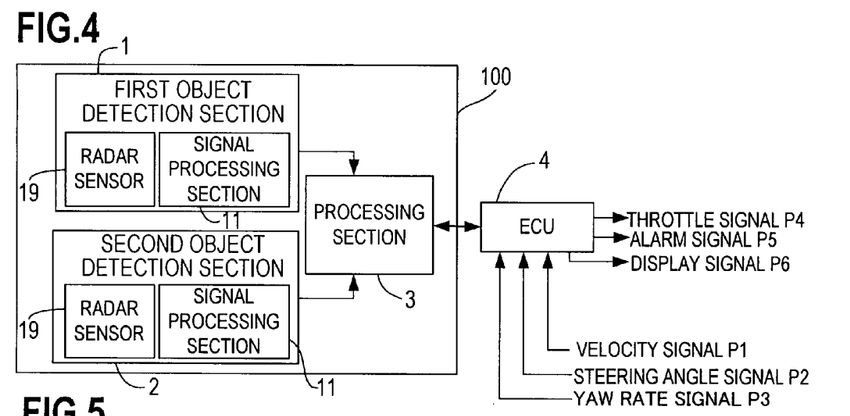
FIG. 4 is a block diagram depicting the radar device according to an embodiment of the present invention.

FIG. 4 is a block diagram depicting the radar device according to a first embodiment of the present invention. The radar device 100 of the present invention is comprised of a first object detection section 1, a second object detection section 2 and a processing section 3. The first object detection section 1 is a long range radar device, and the second object detection section 2 is a short range radar device. The first object detection section 1 and the second object detection section 2 have a signal processing section 11 and a radar sensor 19 respectively. These radar sensors 19 detect objects using an electron scanning system that has an array type receive antennas. The processing section 3, which is comprised of a processor, integrates information from the two object detection sections 1 and 2, and communicates the information on the detected objects to an ECU (Electric Control Unit) 4 installed outside.

Various signals including a velocity signal P1, steering angle information P2 and yaw rate signal P3, from each part of the vehicle, are supplied to the ECU 4. Based on this information and the determined direction, distance and relative velocity of the objects, the ECU 4 warns the driver driving the vehicle via an alarm signal P5 and display signal P6. The ECU 4 can also control slowing the accelerator via the throttle signal P4.

The radar sensors 19 in FIG. 4 correspond to the long range sensor 21 and the short range sensor 22 in FIG. 3. The signal processing sections 11 in FIG. 4 correspond to the signal processing units 23 and 24 in FIG. 3. The processing section 3 in FIG. 4 corresponds to the detection range specification unit 26 and the integration unit 25 in FIG. 3.

Now the configuration of the object detection section will be described.

Figure 5:
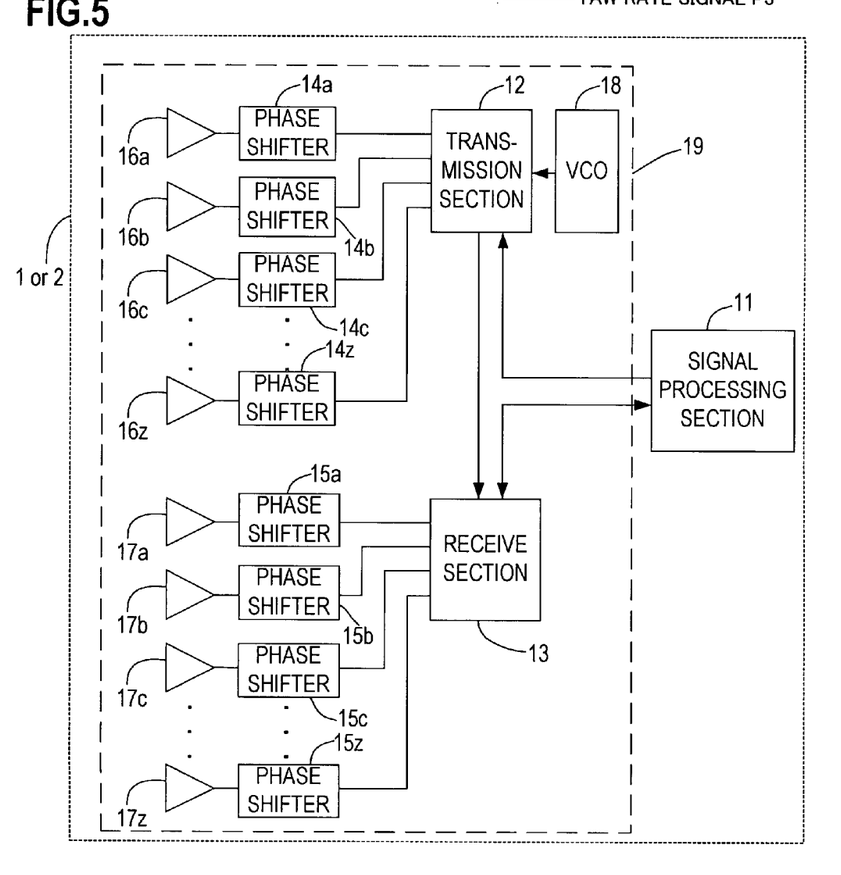
FIG. 5 is a diagram depicting the configuration of the first and second object detection sections in FIG. 4.

FIG. 5 is a diagram depicting the configuration of the first or second object detection section in FIG. 4. The object detection section is comprised of a signal processing section 11, a voltage control oscillator (VCO) 18, a transmission section 12, a receive section 13, transmission phase shifters 14a to 14z, receive phase shifters 15a to 15z, transmission antennas 16a to 16z and receive antennas 17a to 17z. The number of installed transmission phase shifters 14a to 14z is the same as that of the transmission antennas 16a to 16z, and the number of installed receive phase shifters 15a to 15z is the same as that of the receive antennas 17a to 17z. In the object detection section, composing elements other than the signal processing section 11 belong to the radar sensor 19.

In the object detection section, transmission signals generated in the VCO 18 are supplied to the transmission phase shifters 14a to 14z via the transmission section 12, which is comprised of as an amplifier, etc.. The transmission phase shifters 14a to 14z are connected to the transmission antennas 16a to 16z, and change the phases of the transmission signals based on instructions of the signal processing section 11. In this way, the transmission signals, of which phases are changed based on the signal from the VCO 18, are supplied to the transmission antennas 16a to 16z.

Now the directivity of the transmission radio wave will be described.

Figure 6:
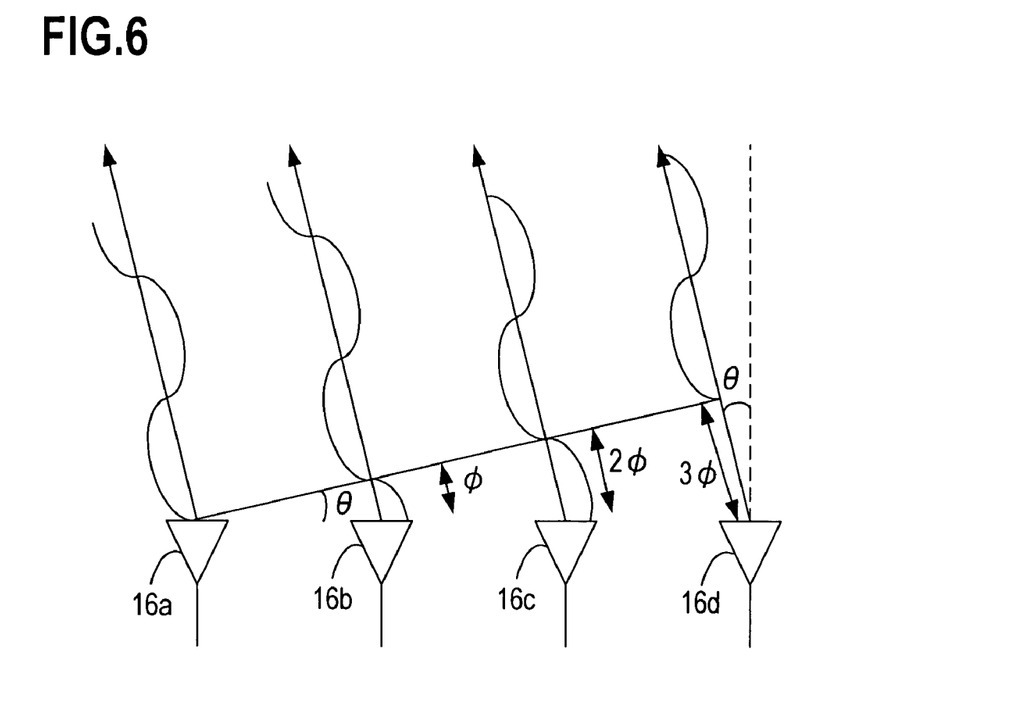
FIG. 6 is a diagram depicting the directivity of transmission radio waves.

FIG. 6 is a diagram depicting the directivity of the transmission radio waves of the transmission section in FIG. 5. In FIG. 6, the transmission antennas 16a to 16d transmit transmission radio waves having different phases depending on the transmission phase shifters 14a to 14d. The transmission radio wave from the transmission antenna 16b precedes the transmission radio wave from the transmission antenna 16a by phase $\phi$. The transmission radio waves from the transmission antenna 16c and the transmission antenna 16d precede the transmission radio wave from the transmission antenna 16a by phase $2\phi$ and phase $3\phi$ respectively.

Because of these phase shifts, the plane of the transmission waves having a same phase inclines from the plane formed by the transmission antenna by the angle $\theta$. This inclination of the plane having a same phase generates directivity of which angle from the front direction is $\theta$ in the transmission wave. In other words, the transmission wave has the maximum radio wave intensity in the angle $\theta$ direction. Therefore the transmission waves are controlled to the detection target directions by controlling this directivity using the transmission phase shifters 14a to 14z.

In this way, the object detection section transmits radio waves having directivity in the angle $\theta$ direction. The waves reflected by an object which exists in the angle $\theta$ direction are received by the receive antennas 17a to 17z. The angle $\theta$ changes in a predetermined cycle, and the object detection section searches an area in front of the radar device 10 of the present invention.

Now reception of reflected radio waves having directivity will be described.

Figure 7:
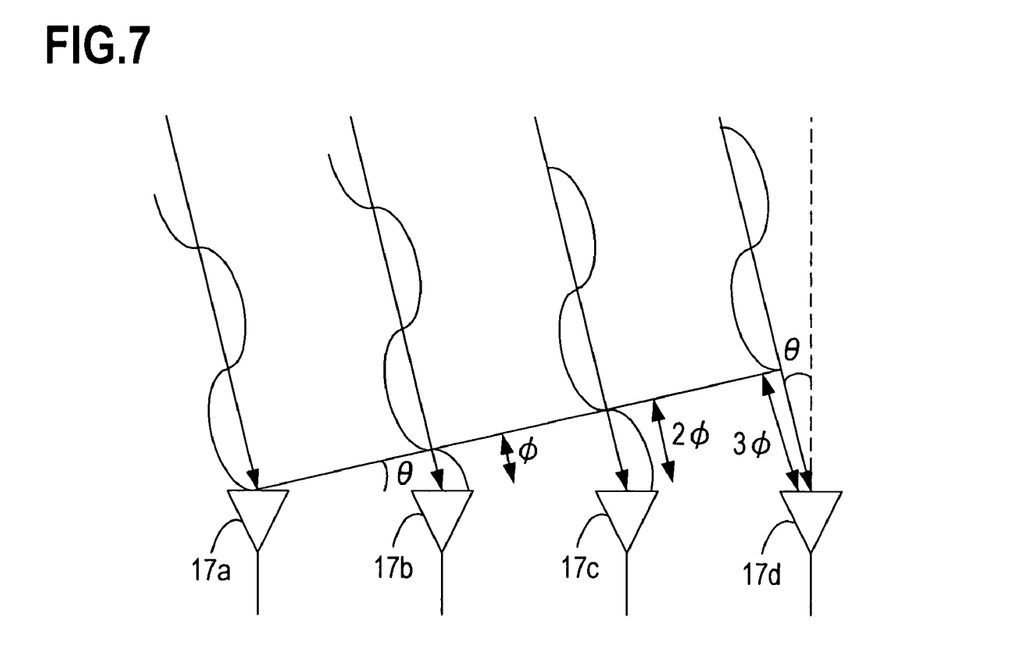
FIG. 7 is a diagram depicting receiving of reflected radio waves having directivity.

FIG. 7 is a diagram depicting the reception of reflected radio waves having directivity by the receive section in FIG. 5. In FIG. 7, the reflected radio waves from the directions inclined from the front directions of the receive antennas 17a to 17d by angle $\theta$ respectively are received sequentially by the receive antennas 17a, 17b, 17c and 17d. Here the transmission radio waves have the directivity of angle $\theta$, so the receive antennas also have the directivity of angle $\theta$. So in order to provide the directivity of angle $\theta$ to the receive antennas, the phases of the receive radio waves are changed using the receive phase shifters 15a to 15z.

A receive radio wave having the same phase as the receive radio wave received by the receive antenna 17a arrives at the receive antenna 17b with a delay by phase $\phi$. The radio waves arrive at the receive antenna 17c and the receive antenna 17d with a delay by phase $2\phi$ and phase $3\phi$ respectively. In order to provide a directivity of angle $\theta$ to the receive antennas, the receive radio waves received by the receive antennas respectively are adjusted so as to be a same phase by the receive phase shifters 15a to 15z. In this way, the receive antennas have a strong sensitivity to radio waves coming from the angle $\theta$ direction.

Then the receive signals, which are output from the receive phase shifters 15a to 15z, are supplied to the first signal processing section 11 via the receive section 13 which is comprised of such components as an amplifier and a filter. The first signal processing section 11 detects objects based on the receive signals.

Now a method for determining a distance to a detected object and a relative velocity with the object will be described.

Figure 8:
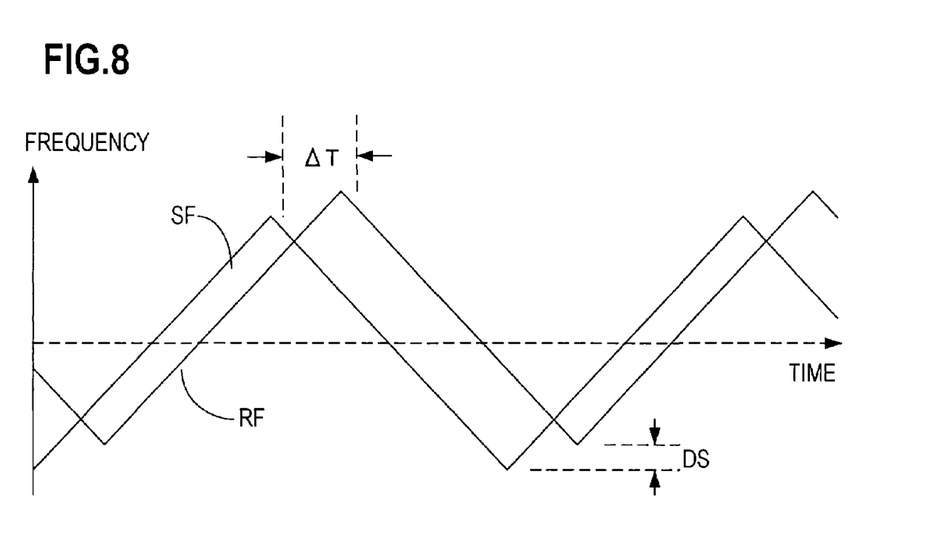
FIG. 8 is a diagram depicting the frequencies of a transmission wave and receive wave.

FIG. 8 is a diagram depicting the frequencies of the transmission wave and the receive wave in FIG. 5. The transmission frequency SF of the transmission radio wave generated by the VCO 18 increases at a predetermined rate during a predetermined time, then decreases at the same rate and returns to the original frequency. The transmission frequency SF repeats this. The receive frequency RF acquired by an object reflecting this transmission wave delays from the transmission frequency SF by the time difference ΔT. Based on this time difference ΔT, the distance to the object, which is reflecting the transmission wave, is calculated. A Doppler shift DS is applied to the receive frequency RF according to the relative velocity of the object which reflects the transmission wave. The relative velocity of the object and the radar device of the present invention are determined based on this Doppler shift DS.

In this way, the first object detection section 1 of the radar device 100 of the present invention detects an object, and determines the direction, distance and velocity of the object.

The second object detection section 2 of the radar device 100 of the present invention has a similar configuration as the first object detection section 1, detects an object using a similar mechanism, and determines the direction, distance and velocity of the object.

The difference between the first object detection section 1 and the second object detection section 2 is whether the detection section is for long range or for short range. The range of the object detection is different between the first object detection section 1 and the second object detection section 2. For example, the detection range of the first object detection section is that the distance is 5 to 140 meters and the width is about 20°. The detection range of the second object detection section 2 is that the distance is 1 to 30 meters and the width is about 40°, for example. The frequency of the transmission radio wave is about 76 GHz, for example, for the first object detection section 1, which is for long range, and is about 24 GHz, for example, for the second object detection section 2, which is for short range. The number of the antennas and the space of the antennas are also different between the first object detection section 1 and the second object detection section 2.

Figure 9:
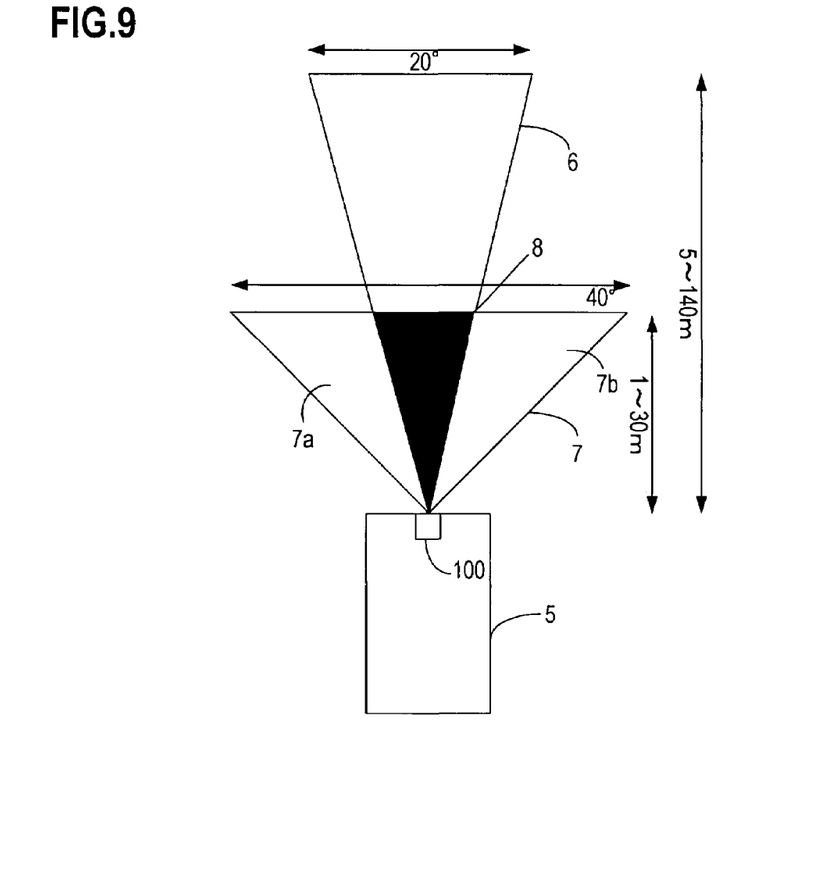
FIG. 9 is a diagram depicting object detection ranges of the first object detection section and the second object detection section.

FIG. 9 is a diagram depicting the object detection ranges of the first object detection section and the second object detection section. The radar device 100 of the present invention mounted on a vehicle 5 detects objects in a first detection range 6 and a second detection range 7 by two object detection sections 1 and 2. The first detection range 6 and the second detection range 7 have an overlapped range 8 where these detection ranges 6 and 7 overlap.

Here the processing section 3 performs overlap prevention processing to prevent the first object detection section 1 and the second object detection section 2 from both performing the signal processing for the overlapped range 8.

Figure 10:
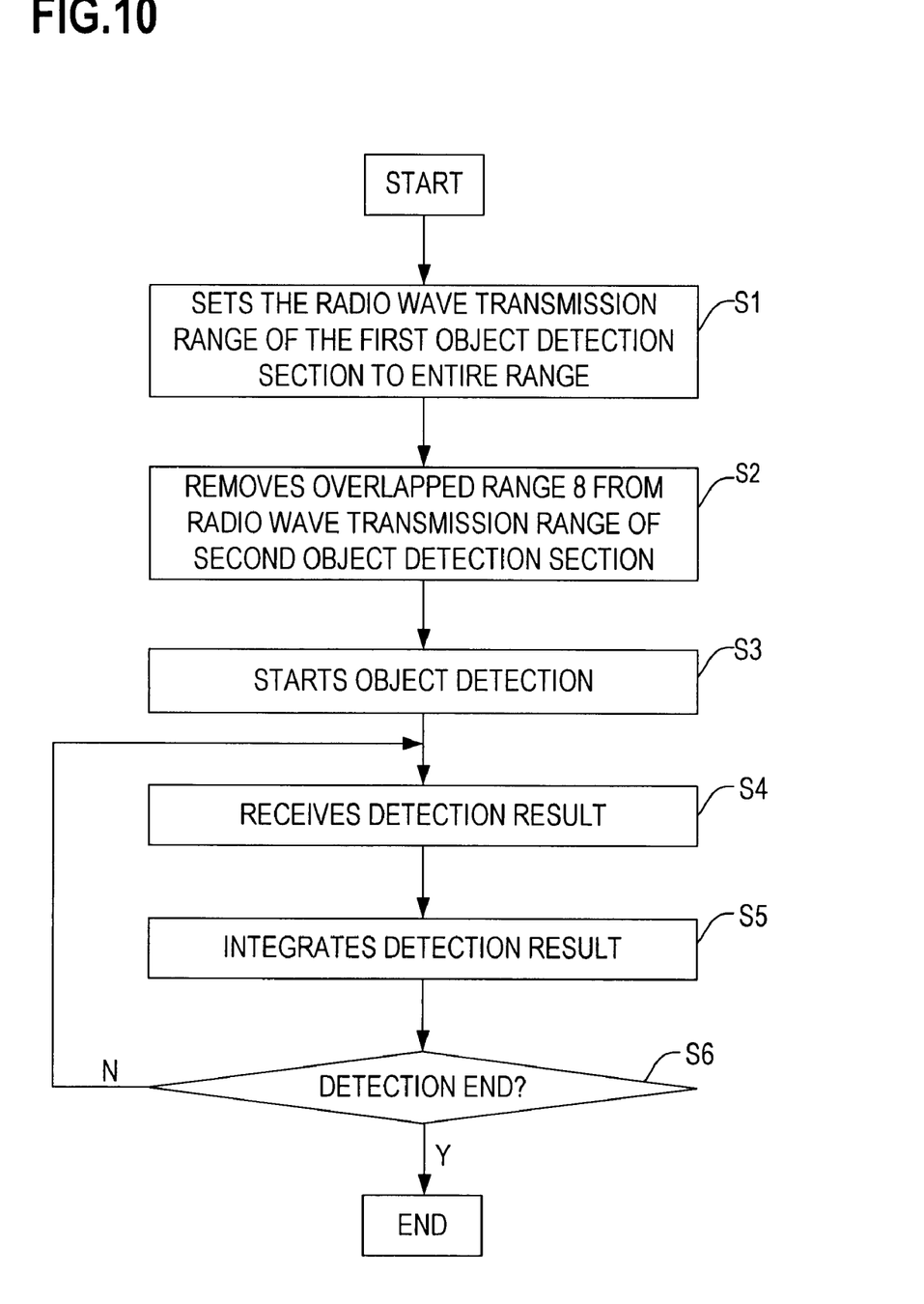
FIG. 10 is a flow chart depicting an overlap prevention processing of the processing section 3 in the first embodiment of the present invention.

FIG. 10 is a flow chart depicting the overlap prevention processing of the processing section 3 according to the first embodiment of the present invention. First the processing section 3 specifies the radio wave transmission range of the first object detection section 1 to a first detection range 6, which is an entire range where the first object detection section 1 can detect objects (step S1). At this time, receiving the specification from the processing section 3, the signal processing section 11 of the first object detection section 1 requests the receive section 12 to receive the reflected waves from the 5 to 140 meter distances corresponding to all the detection ranges.

Then the radio wave transmission range of the second object detection section 2 is specified to an area resulting when the overlapped range 8 is subtracted from a second detection range 7, which is the entire range where the second object detection section 2 can detect (step S2). At this time, receiving the specification from the processing section 3, the signal processing section 11 of the second object detection section 2 supplies an angle width of the transmission/reception of the radio waves to the transmission phase shifter 14 and the receive phase shifter 15 via the transmission section 12. The detection range is specified by supplying the angle, excluding the overlapped range 8, to the transmission phase shifters 14 and the receive phase shifters 15.

Then after step S2, the object detection by the first object detection section 1 and the second object detection section 2 is started (step S3). By the specification in step S2, the transmission section of the second object detection section 2 does not transmit the transmission radio wave or perform receive processing of radio waves for directions from about +10° to −10°. When the second object detection section 2 completes the object detection at the left side portion 7a, separated by the overlapped range 8 in the second detection range 7, the second object detection section 2 immediately performs object detection for the right side portion 7b separated by the overlapped range 8. After step S3, the processing section 3 receives the detection results from the first and second object detection sections (step S4).

The processing section 3 integrates the detection result received from the first and second object detection sections in step S4 (step S5). The step S4 and step S5 are repeated until the radar device of the present embodiment ends object detection, and processing flow ends when the end of detection is confirmed in step S6.

In this way, an overlap of the detection range of the first object detection section 1, which is the long range radar, and the detection range of the second object detection section 2, which is the short range radar, is prevented, and signal processing of the receive radio waves in the detection range of the short range radar is decreased and made efficient, therefore the detection result can be output faster. Also two detection results are not acquired for one object, so the processing capability of the processor is not wasted or processing time is not wasted for integrating two detection results, which makes processing efficient.

In the present embodiment, the transmission and reception of radio waves to/from the overlapped range 8 are stopped in the second object detection section 2, but reception of reflected waves from the overlapped range 8 may be stopped in the first object detection section 1.

In this case, the detection range of the second object detection section 2 is set to the second detection range 7 including the overlapped range 8. The detection range of the first object detection section 1 is set to the first detection range 6 excluding the overlapped range 8. At this time, the receive section 13 of the first object detection section 1 does not perform receive processing for a reflected wave having a frequency indicating that the reflected wave comes from about a 1 to 30 meter distance.

In this way, an overlap of the detection range of the first object detection section 1, which is the long range radar, and the detection range of the second object detection section 2, which is the short range radar, is prevented, and the signal processing of the receive radio waves in the detection range of the long range radar is decreased and made efficient, therefore the detection result can be output faster. Also two detection results are not acquired for one object, so the processing capability of the processor is not wasted or processing time is not wasted for integrating two detection results, which makes processing efficient.

In another embodiment, the signal processing in the overlapped range 8 can be prevented in both the first object detection section 1 and the second object detection section 2.

Figure 11:
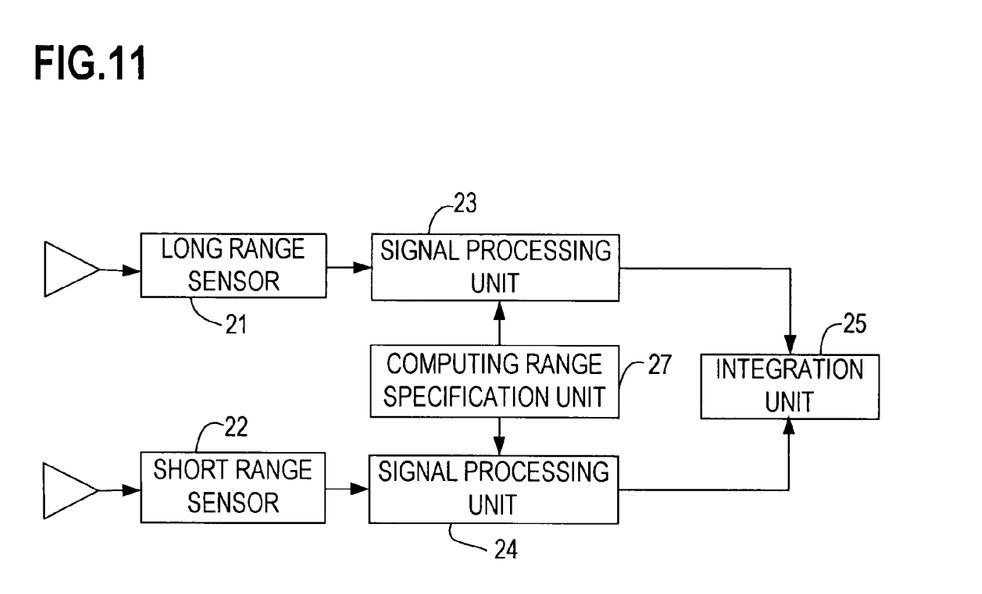
FIG. 11 is a conceptual diagram depicting an overlap prevention of a radar device according to the second embodiment of the present invention.

FIG. 11 is a conceptual diagram depicting the overlap prevention in the radar device according to the second embodiment of the present invention. A computing range specification unit 27 specifies the computing ranges of signal processing units 23 and 24 respectively. At this time, the specification is performed so that the computing ranges do not overlap. A long range sensor 21 and a short range sensor 22 send radio waves to the detection ranges of objects respectively to detect objects. The long range sensor 21 and the short range sensor 22 supply the received signals to the signal processing units 23 and 24 respectively.

Based on the supplied signals, the signal processing units 23 and 24 determine the distance, direction and velocity of the objects in the specified computing ranges. The information on the objects determined by the signal processing units 23 and 24 are supplied to an integration unit 25, and the integration unit 25 integrates the provided information. Since the computing ranges do not overlap, no object, detected by both of the signal processing units 23 and 24, exists.

In the second embodiment, the configuration in FIG. 4 or FIG. 5 is used, just like the first embodiment. The long range sensor 21 and the short range sensor 22 correspond to the radar sensors 19 in FIG. 4. The signal processing sections 23 and 24 correspond to the signal processing units in FIG. 4. The computing range specification unit 27 corresponds to the processing section 3 in FIG. 4. And the integration unit 25 also corresponds to the processing section 3 in FIG. 4. In this conceptual diagram in FIG. 11, the computing range specification unit 27 specifies computing ranges respectively for the signal processing units 23 and 24, but the computing range may be specified only for one of the signal processing units, while the other signal processing unit performs conventional computing.

Figure 12:
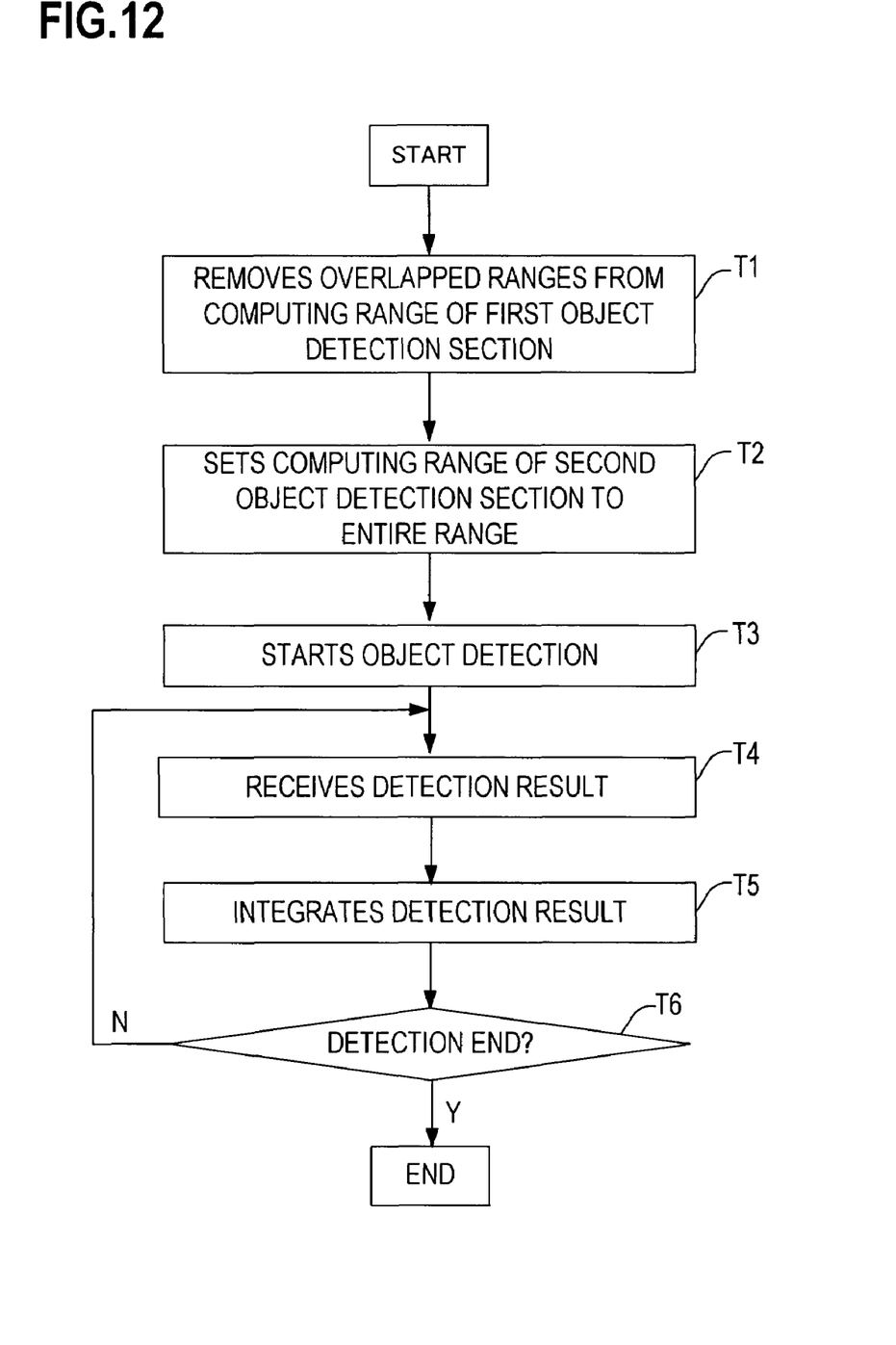
FIG. 12 is a flow chart depicting an overlap prevention processing of the processing section 3 according to the second embodiment of the present invention.

FIG. 12 is a flow chart depicting the overlap prevention processing of the processing section 3 according to the second embodiment. First the processing section 3 specifies the computing range of the first object detection section 1 to a range resulting when the overlapped range 8 is subtracted from the first detection range 6, which is an entire range that the first object detection section 1 can detect (step T1). At this time, receiving the specification of the processing section 3, the signal processing section 11 of the first object detection section 1 is set so as to compute the reflected waves from about a 30 to 140 meter distance.

Then the computing range of the second object detection section 2 is set to the second detection range 7, which is an entire range that the second object detection section 2 can detect (step T2). At this time, receiving the specification from the processing section 3, the signal processing section 11 of the second object detection section 2 is set so as to compute the reflected waves from about a 1 to 30 meter distance, which is the entire range that can be detected.

After step T2, object detection by the first object detection section 1 and the second object detection section 2 are started (step T3). Because of the specification in step T2, the signal processing section 11 of the first object detection section 1 does not perform computing processing for the reflected waves from about a 1 to 30 meter distance. Then the detection result is supplied from the first and second object detection sections (step T4).

Then the processing section 3 integrates the detection results received from the first and second object detection sections in step T4 (step T5). Then step T4 and step T5 are repeated until the radar device of the present embodiment ends the object detection, and the processing flow ends when the end of detection is confirmed in step T6.

In this way, an overlap of the detection range of the first object detection section 1, which is the long range radar, and the detection range of the second object detection section 2, which is the short range radar, is prevented, and signal processing of the receive radio waves in the detection range of the long range radar is decreased and made efficient, therefore the detection result can be output faster. Also two detection results are not acquired for one object, so the processing capability of the processor is not wasted or processing time is not wasted for integrating two detection results, which makes processing efficient.

In the present embodiment, computing processing for the receive waves from the overlapped range 8 is stopped in the first object detection section 1, but the computing processing for the receive waves from the overlapped range 8 may be stopped in the second object detection section 2.

In this case, the computing range of the first object detection section 1 is set to the first detection range 6 that includes the overlapped range 8. The computing range of the second object detection section 2 is set to the second detection range 7 that does not include the overlapped range 8. At this time, the signal processing section of the second object detection section 2 does not perform signal processing for the receive signal of the reflected waves from about a +10° to −10° range.

In this way, an overlap of the detection range of the first object detection section 1, which is the long range radar, and the detection range of the second object detection section 2, which is the short range radar, is prevented, and the signal processing of the receive radio waves in the detection range of the short range radar is decreased and made efficient, therefore the detection result can be output faster. Also two detection results are not acquired for one object, so the processing capability of the processor is not wasted or the processing time is not wasted for integrating two detection results, which makes processing efficient.

In another embodiment as well, performing the signal processing in the overlapped range 8 by both the first object detection section 1 and the second object detection section 2 can be prevented.

Figure 13:
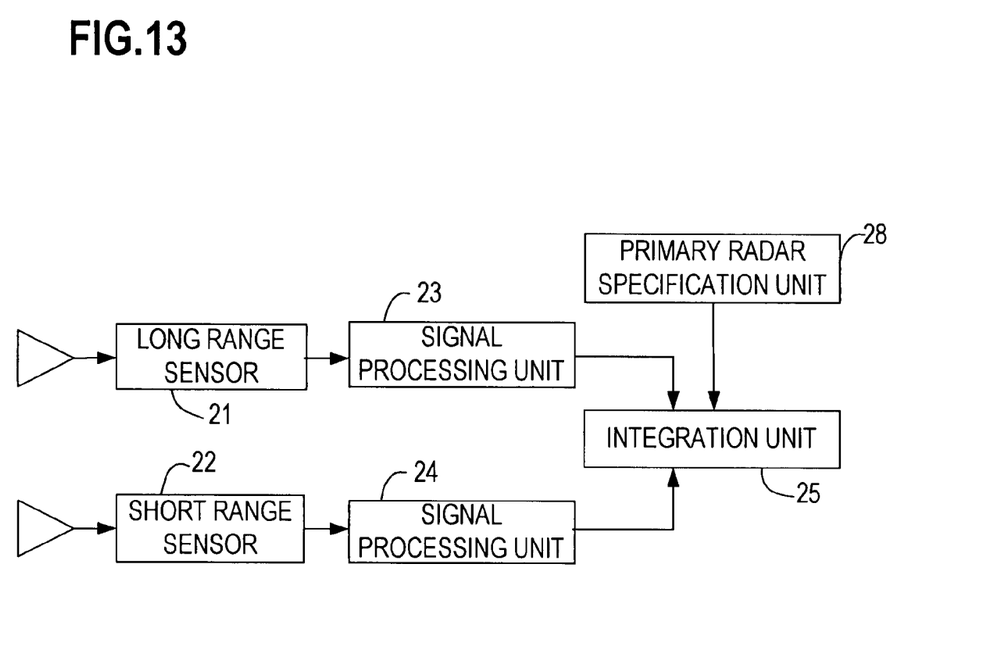
FIG. 13 is a conceptual diagram depicting an overlap prevention of a radar device according to the third embodiment of the present invention.

FIG. 13 is a conceptual diagram depicting the overlap prevention in the radar device according to the third embodiment of the present invention. A primary radar specification unit 28 specifies the long range sensor 21 or the short range sensor 22 as a primary radar for using detection information in the overlapped range 8 to the integration unit 25. Then the long range sensor 21 and the short range sensor 22 transmit radio waves to the respective object detection ranges and detect objects. The long range sensor 21 and the short range sensor 22 supply the received signals to the signal processing units 23 and 24 respectively.

Then based on the supplied signals, the signal processing units 23 and 24 determine the distance, direction and velocity of the objects. The information on the objects determined by the signal processing units 23 and 24 are supplied to the integration unit 25, and the integration unit 25 integrates the provided information. At this time, the information from the sensor specified as the primary radar is used for the information on the objects in the overlapped range 8.

In the third embodiment of the present invention, the configuration in FIG. 4 or FIG. 5 is used, just like the first embodiment. The long range sensor 21 and the short range sensor 22 correspond to the radar sensors 19 in FIG. 4. The signal processing units 23 and 24 correspond to the signal processing sections in FIG. 4. The primary radar specification unit 28 corresponds to the processing section 3 in FIG. 4. The integration unit 25 also corresponds to the processing section 3 in FIG. 4.

Figure 14:
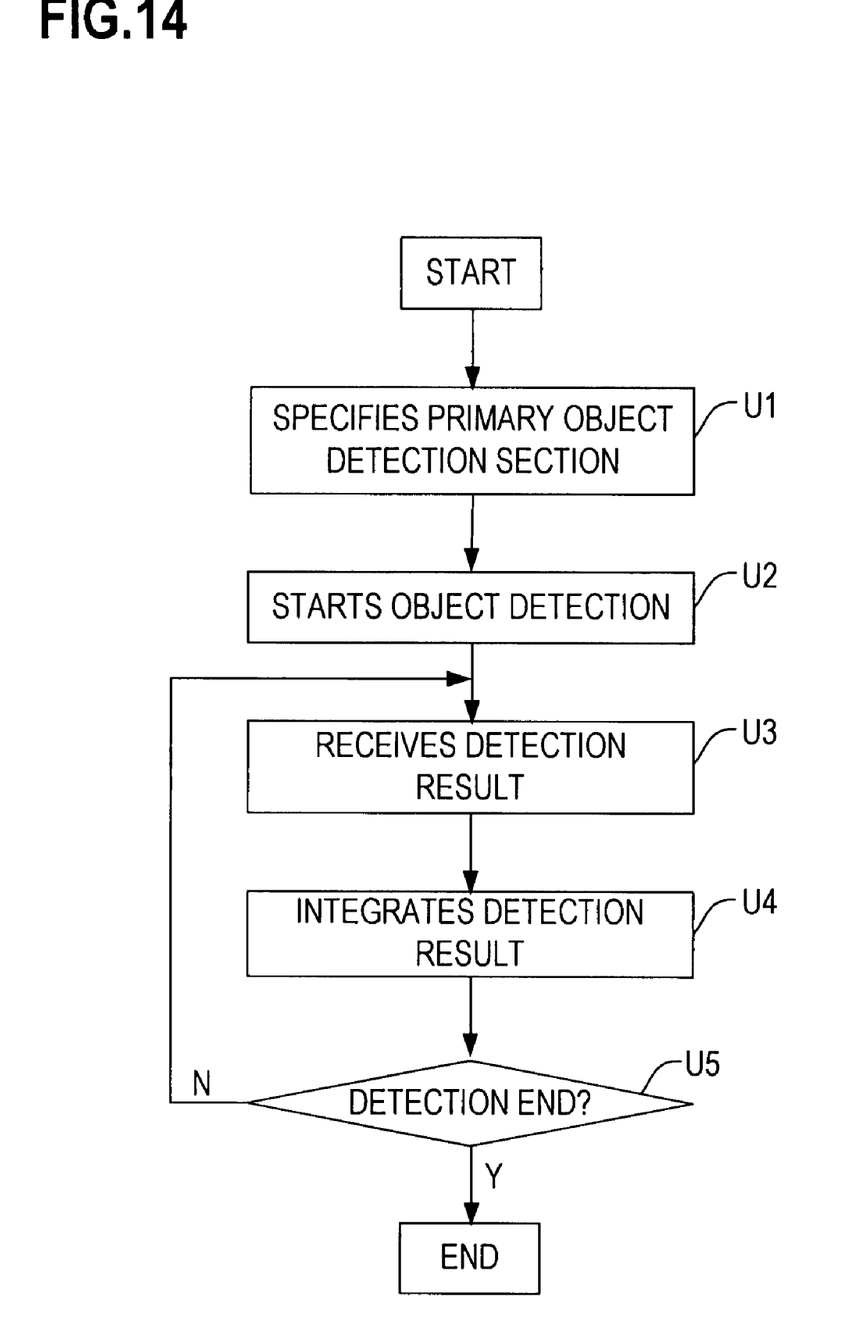
FIG. 14 is a flow chart depicting an overlap prevention processing of the processing section 3 according to the third embodiment of the present invention.

FIG. 14 is a flow chart depicting the overlap prevention processing of the processing section 3 according to the third embodiment of the present invention. First the processing section 3 specifies the primary object detection section (step U1). The primary object detection section is an object detection section of which object detection result in the overlapped range 8 is used by the processing section 3. Here the first object detection section 1 is specified to the primary object detection section. After step U1, object detection is started (step U2), and the detection results are supplied from the first and second object detection sections 1 and 2 (step U3).

The processing unit 3 integrates the detection results received from the first and second object detection sections 1 and 2 in step U3 (step U4). At this time, the result by the first object detection section 1 specified as the primary object detection section is used for the detection in the overlapped range 8. Step U3 and step U4 are repeated until the radar device of the present embodiment ends object detection, and the processing flow ends when the end of detection is confirmed in step U5.

In this way, in the radar device of the present embodiment, the processing capability of the processor is not wasted or the processing time is not wasted for integrating two detection results, which makes processing efficient. In the present embodiment, the primary object detection section is the first object detection section 1, but may be the second object detection section 2.

In this description, a radar device having digital beam forming antennas was used for explanation, but the antennas used for the present invention may be mono-pulse antennas. The present invention can also be applied to a radar device using a movable type radar sensor in stead of the electronic scanning type radar sensor.

What is claimed is:

1. A radar device, comprising:
a long range radar sensor comprising:
a first transmission section for transmitting a radio wave to a first detection range of which center is a predetermined direction;
a first receive section for receiving a reflected wave of the radio wave from the first detection range; and
a first signal processing section for computing a receive signal supplied from the first receive section and detecting an object existing in the first detection range;
a short range radar sensor comprising:
a second transmission section for transmitting a radio wave to a second detection range of which center is the predetermined direction, and of which width is wider and of which distance is shorter than the first detection range;
a second receive section for receiving a reflected wave of the radio wave from the second detection range; and
a second signal processing section for computing a receive signal supplied from the second receive section and detecting an object existing in the second detection range; and
a processing section for integrating information on a detected object supplied from the first and second signal processing sections,
wherein the second transmission section is set so as to stop transmission of the radio wave to an overlapped range included in both the first and second detection ranges.

2. A radar device, comprising:
a long range radar sensor comprising:
a first transmission section for transmitting a radio wave to a first detection range of which center is a predetermined direction;
a first receive section for receiving a reflected wave of the radio wave from the first detection range; and
a first signal processing section for computing a receive signal supplied from the first receive section and detecting an object existing in the first detection range;
a short range radar sensor comprising:
a second transmission section for transmitting a radio wave to a second detection range of which center is the predetermined direction, of which width is wider and of which distance is shorter than the first detection range, and which partially overlaps with the first detection range;
a second receive section for receiving a reflected wave of the radio wave from the second detection range; and
a second signal processing section for computing a receive signal supplied from the second receive section and detecting an object existing in the second detection range; and
a processing section for integrating information on a detected object supplied from the first and second signal processing sections,
wherein one of the first and second signal processing sections stops the computing processing of the receive signal based on a reflected wave from an overlapped range included in both the first and second detection ranges.

3. A radar device, comprising:
a long range radar sensor comprising:
a first transmission section for transmitting a radio wave to a first detection range of which center is a predetermined direction;
a first receive section for receiving a reflected wave of the radio wave from the first detection range; and
a first signal processing section for computing a receive signal supplied from the first receive section and detecting an object existing in the first detection range;
a short range radar sensor comprising:
a second transmission section for transmitting a radio wave to a second detection range of which center is the predetermined direction, of which width is wider and of which distance is shorter than the first detection range, and which partially overlaps with the first detection range;
a second receive section for receiving a reflected wave of the radio wave from the second detection range; and
a second signal processing section for computing a receive signal supplied from the second receive section and detecting an object existing in the second detection range; and
a processing section for integrating information on a detected object supplied from the first and second signal processing sections,
wherein the processing section detects an object using only information supplied from one of the first and second signal processing sections, out of the information on an object detected in the overlapped range included in both the first and second detection ranges.

* * * * *